Figure 7:
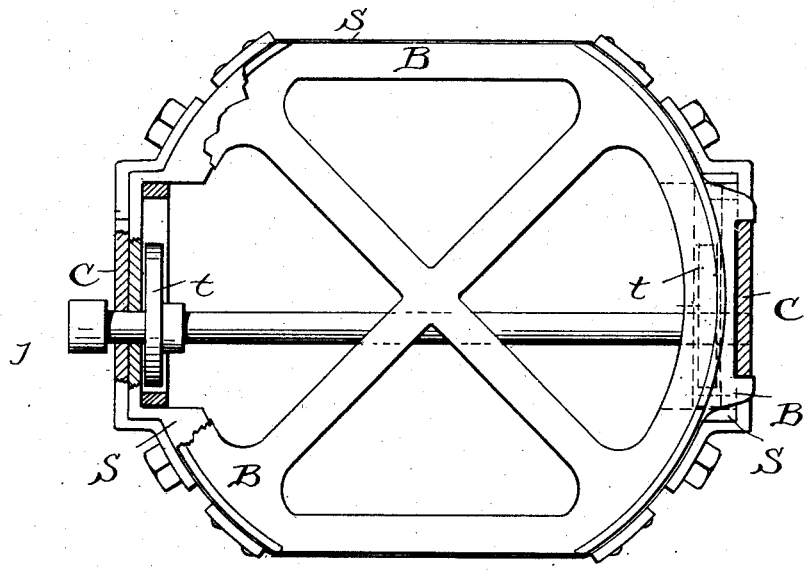

A. C. PANCOAST.
MASHING, MIXING, AND CHURNING MACHINE.
APPLICATION FILED MAR. 14, 1907.
901,465.
Patented Oct. 20, 1908.
4 SHEETS—SHEET 1.
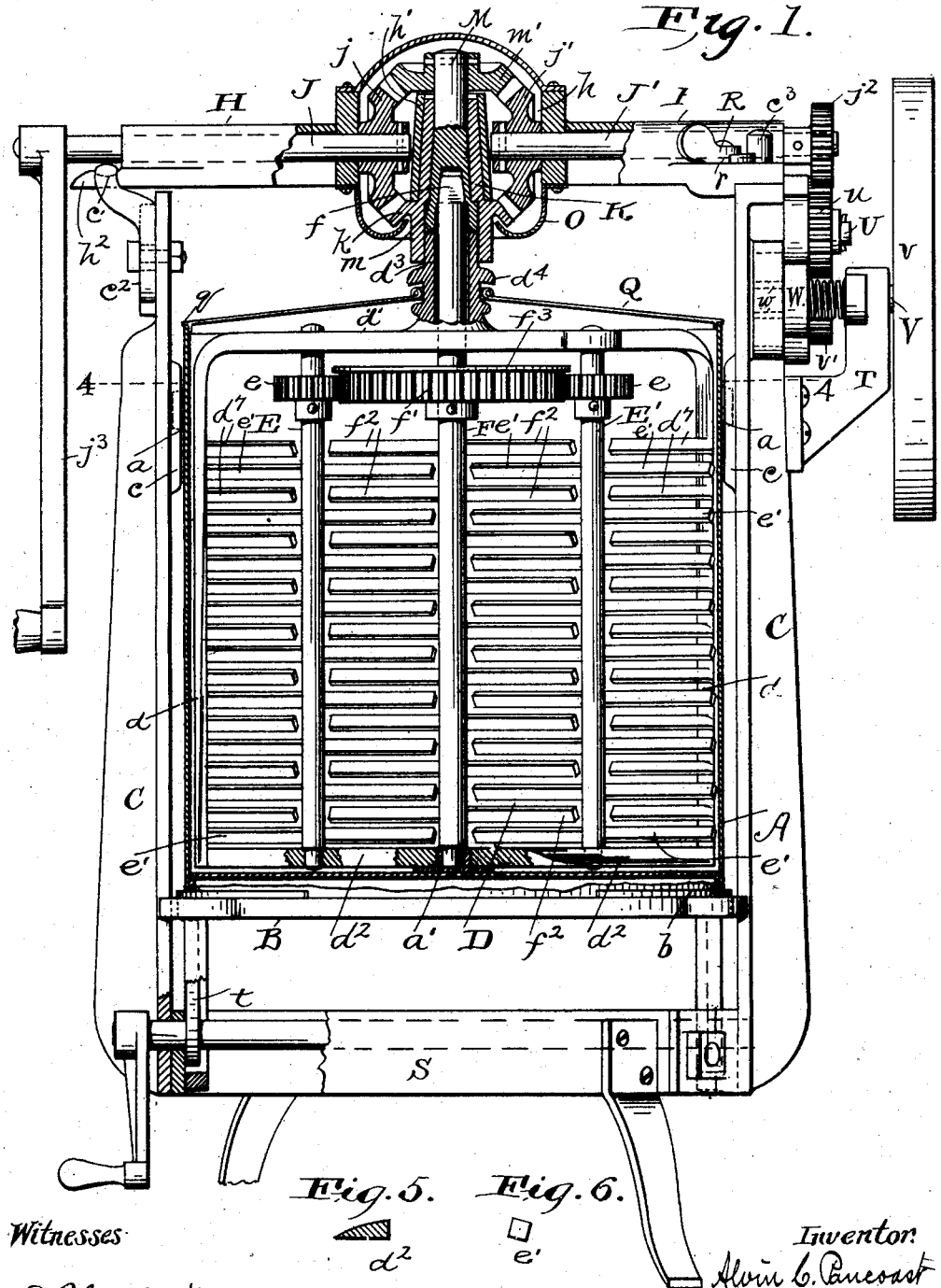
Witnesses
E. B. Gilchrist.
H. R. Sullivan
Inventor:
Alvin C. Pancoast
By Thurston Woodward
Attys.

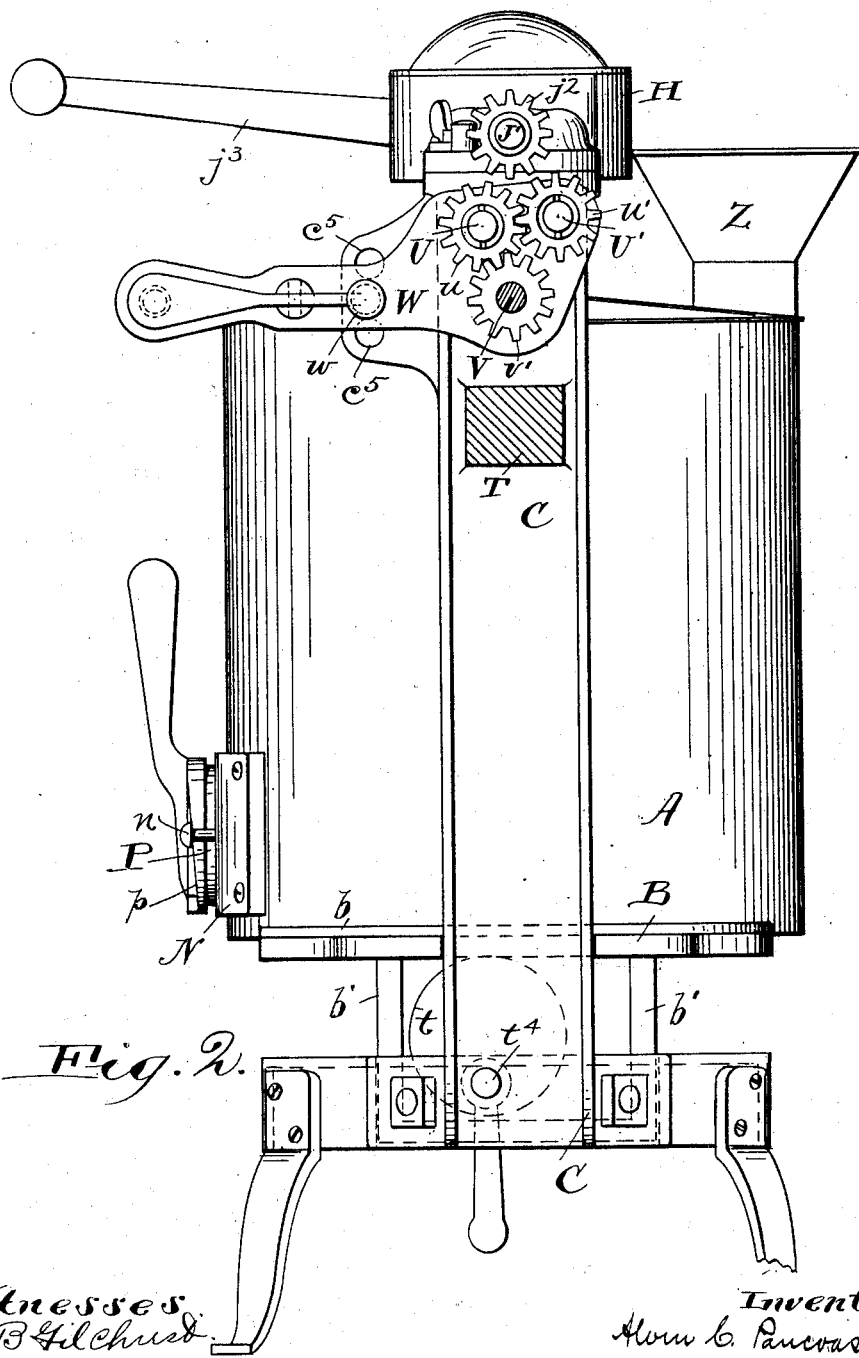

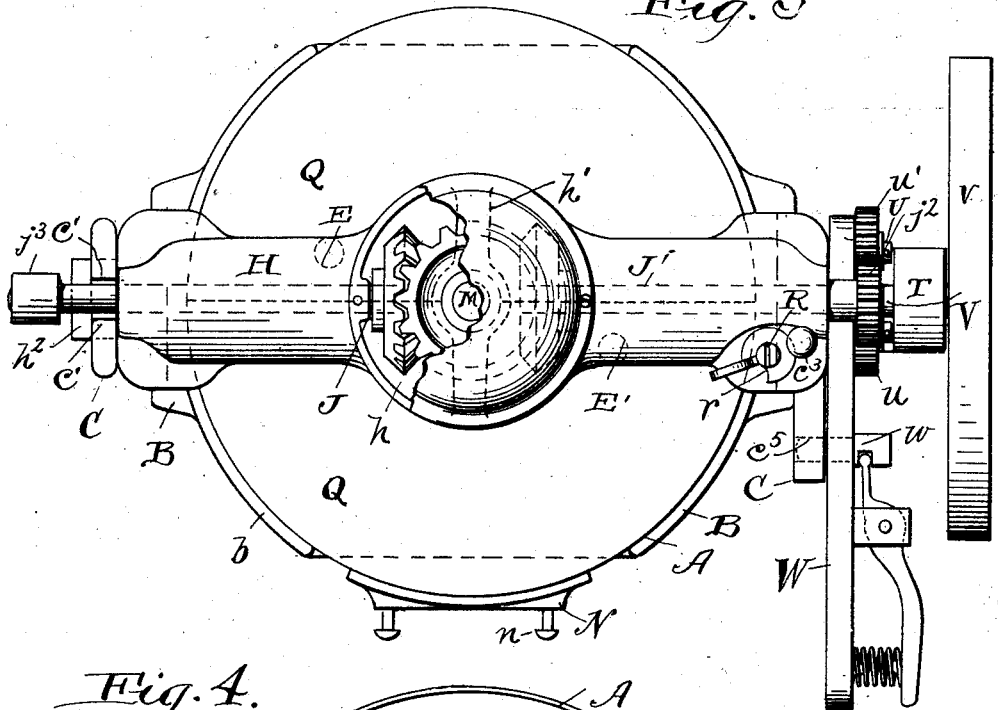
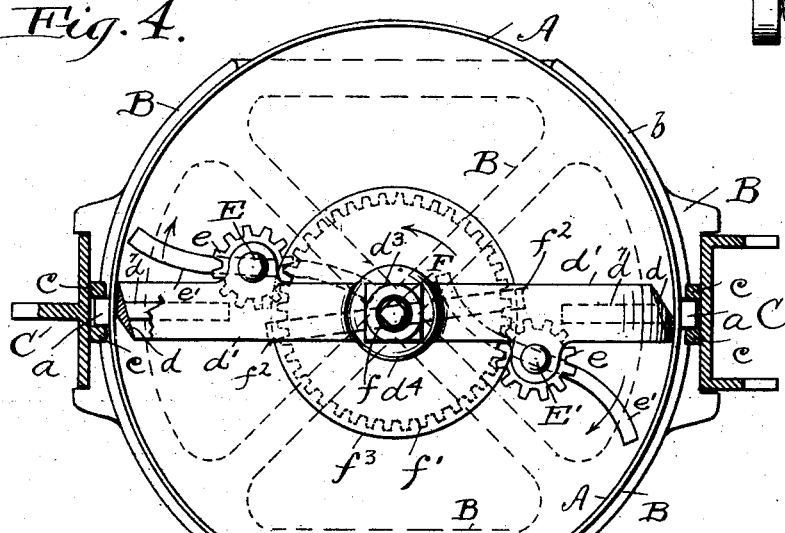

A. C. PANCOAST.
MASHING, MIXING, AND CHURNING MACHINE.
APPLICATION FILED MAR. 14, 1907.

901,465.

Patented Oct. 20, 1908.

4 SHEETS—SHEET 4.

UNITED STATES PATENT OFFICE.

ALVIN C. PANCOAST, OF CLEVELAND, OHIO, ASSIGNOR OF ONE-FOURTH TO WILLIAM G. PANCOAST, OF CLEVELAND, OHIO.

MASHING, MIXING, AND CHURNING MACHINE.

No. 901,465.    Specification of Letters Patent.    Patented Oct. 20, 1908.

Application filed March 14, 1907.    Serial No. 362,336.

*To all whom it may concern:*

Be it known that I, ALVIN C. PANCOAST, a citizen of the United States, residing at Cleveland, in the county of Cuyahoga and State of Ohio, have invented a certain new and useful Improvement in Mashing, Mixing, and Churning Machines, of which the following is a full, clear, and exact description.

The invention in the form in which it is shown in the drawing is contrived with special reference for use as a potato masher; but the invention is also adapted for various other uses, for example, for the mashing of all sorts of vegetables and analogous substances, as a mixer of fluid or plastic materials, as a churn, ice cream freezer, etc. It is adapted for all of these uses in the precise form shown, although possibly some slight changes in this construction might be advisable to render it best suited for any of these specific uses, except that of a potato masher.

Figure 8:
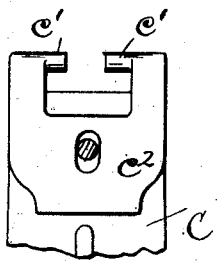

In the drawing, Figure 1 is a central vertical sectional view of the machine. Fig. 2 is a side elevation thereof when the bracket which supports a supplementary driving shaft is cut away. Fig. 3 is a plan view of the machine; Fig. 4 is a sectional plan view in about the plane indicated by line 4—4 of Fig. 1. Fig. 5 is a vertical sectional view of the lower member of the rotating beater frame; Fig. 6 is an end view of a beater arm. Fig. 7 is a sectional plan view of the base of the machine, the table B being partly broken away; and Fig. 8 is a side view of the upper part of one of the standards C and the loop carrying plate adjustably secured to it.

Referring to the parts by letters A represents the cylindrical receptacle which may be made of tin plate or any suitable material. It is adapted to rest upon a table B; and it is to be prevented from rotating by the engagement of lugs, $a$, between two short vertical ribs $c$ on the standards C, which are located at the sides of the machine. Within this receptacle is a rectangular beater frame D consisting of two side members $d$, and top and bottom members $d'$ $d^2$,—the side members being arranged close to the inner periphery of the receptacle A. Three beater shafts E, E' and F are rotatably mounted in the top and bottom members of this beater frame. The two beater shafts E, E' are reduced in diameter at their lower ends, and the reduced portions fit comfortably in cylindrical holes in the lower frame member $d^2$,—the shoulder at the junction of each shaft and the reduced portion thereof resting upon the top surface of the lower frame member $d^2$. The beater frame has in its lower member a centrally disposed cylindrical hole which, when the parts are assembled, embraces a cylindrical hollow stud $a'$ secured to the bottom of the receptacle. When the lower frame member is embracing this stud, the reduced lower end of the beater shaft F is rotatably fitted in the cylindrical hole in this stud and the shoulder at the junction between this shaft and its reduced lower end rests upon the top of this stud. The two shafts E, E' pass rather loosely through the upper frame member $d'$ in which they are adapted to rotate. The upper frame member $d'$ has a long upwardly extended boss $d^3$ with a cylindrical hole running vertically through it. The shaft F passes loosely through this hole, and its upper end at $f$ which extends above said boss, is squared or made of some other angular formation for engagement with a device for driving it.

Secured to the shaft F at a suitable distance below the upper beater-frame member $d'$ is a gear $f'$; this gear meshes with two pinions $e$, which are respectively secured to the shafts E and E'. These gears and pinions are secured to their respective shafts at such distances below the upper frame member $d'$ that, under proper circumstances, they permit the upward movement of said shafts in said frame such a distance as will withdraw the lower ends of said shafts from their engagement with the lower frame member $d'$ and then the upper ends of said shafts may be drawn down out of the upper frame member. This is a valuable characteristic in a device of this sort, because it enables one to remove the beater shafts E, E' and F from the frame for the purpose of cleansing them and the frame. On gear $f'$ is an outwardly extended flange $f^3$ which overhangs both pinions $e$,—the function of this flange being to prevent any upward movement of shafts E, E', while the machine is in operation. It will be seen from the drawing and subsequent description that upward movement of shaft F, during operation, is effectually prevented.

To each of the shafts E, E' the horizontal beater arms $e'$ are secured. Similar horizontal beater arms $f^2$ are preferably secured to the shaft F, and other similar beater arms $d^7$ are attached to the side members $d$ of beater frame D. All of these beater arms lie in substantially horizontal planes and are so disposed that the beater arms $e'$ will play between the beater arms $f^2$ and $d^7$; and all of the beater arms are substantially as long as they can be and still be capable of swinging around without striking any part of the mechanism. The beater arms $e'$ will, because of the position of the shafts E, E' with respect to the sides of the receptacle, swing close to said sides. Each of the beater arms mentioned is preferably rectangular in cross section; and they are secured to their supports with their faces inclined,—the inclination being preferably such that the front faces are inclined upward and backward, whereby, when the beater shafts are in rotation in the forward direction, these arms, acting like inclined planes, will tend to throw the material in the receptacle upward. When potatoes are being mashed and mixed, this action makes them light and creamy. The beater arms $e'$ are preferably curved, as shown, so that when the beater shafts are rotating in the mixing direction the concave edge of these beater arms will be on the front sides of said arms, whereby these arms not only tend to throw the material upward but also tend to throw it inward toward the center of the receptacle. The side members $d$ of the beater frame D are made of peculiar shape, which is of great service in enabling the machine to efficiently do its work. That is to say, the inner face of each of these vertical members is inclined from its front edge away from the sides of the receptacle. When, therefore, this beater frame is turned in the receptacle in one direction, the front edge of these bars, which move very close to, but not in actual contact with, the inner wall of the receptacle, will gather the material and force it toward the center. A portion of the outer face of these side members is also inclined, but in the reverse direction to the inner sides, as above described, so that, if the direction of rotation of the beater frame D is reversed these members will act to force the material outward against the wall of the receptacle. The lower member $d^2$ of the beater frame is also inclined on its top surface, in opposite directions on opposite sides of the axis,—the incline extending from the front edge of the frame upward and rearward. This lower frame member lies close to the bottom of the receptacle, and in rotation tends to lift the material from said bottom.

Mechanism must be provided for rotating both the beater frame D and the beater shaft F. The mechanism provided is not widely different from mechanism which is in use on ice cream freezers. It consists of a supporting bar H which may be removably secured on top of the standards C. As shown, two shafts J and J' are rotatably mounted in suitable bearings carried by this bar. Within a central casing $h$, which is a part of the bar H the beveled gears $j$, $j'$ are respectively secured to the shafts J, J'. Within this casing is a cross arm $h'$ integral with it which furnishes the bearings for the tubular hub K of a beveled gear $k$ which meshes with both of the beveled gears $j$, $j'$. A vertical shaft M is rotatably mounted in the hub K, and it has a shoulder $m$ which engages with a corresponding shoulder in the hub K, and thereby prevents the latter from moving downward without being accompanied by the shaft M. To the upper end of the shaft M a beveled gear $m'$ is secured, and it meshes with the beveled gears $j$, $j'$. It is rigidly fixed to the shaft M, and bears upon the top of the bearing $h'$, above referred to.

The upper end of the boss $d^3$ is made square or of some other angular formation; and the lower end of the hub $k$ is made of similar form to fit thereover. There is a socket, shaped to fit the upper end $f$ of the beater shaft F, formed in the lower end of the shaft M. When this bar and the parts above described, carried thereby, are secured in place, and the boss $d^3$ and shaft F are in the described sockets, and the shaft J is turned, the beater frame D and the beater shaft F will be rotated, but in opposite directions. Consequently the shafts E, E' will be rotated in the same direction to that in which shaft F rotates, but at much greater speed.

In the side of the receptacle and near the bottom thereof is a suitable outlet which may be closed by any suitable valve closing device. In the form shown a plate N is secured to the outer face of the receptacle, and a circular hole is made through the receptacle and this plate. A valve disk P is provided on its inner end with a cylindrical plug, which is fitted to this hole and is provided on its periphery with annular inclines $p$. The plate carries suitable shoulders for engaging with these inclines. These may be merely the heads of screws screwing into said plate. This valve disk has a suitable handle, by which it may be turned. This makes a tight and easily removable valve for this hole.

When it is desired to remove the mashed and mixed vegetables, this valve is removed, and the motion of the beater frame and arms is reversed. This results in a tendency on the part of the material to move downward, and outward toward the wall of the receptacle,—that is to say in the reverse direction to that in which it tends to move when the parts are moved in the mixing direction. Through the rotation backward of the described movable mechanism within the receptacle substantially all of the mashed and mixed material can be forced out of this valve opening.

Q represents a cover having a flange $q$ which fits in the top of the receptacle. This cover is made in two halves, one of which is shown in Fig. 1. A diametrical dotted line on Fig. 3 indicates the plane in which the two halves separate, and the cover parts fit close around the boss $d^3$. Upon this boss above this cover is an outwardly extended flange $d^4$ which sheds any dirt or oil or anything of the sort which may be in the bearings of the mechanism carried by the bar H onto the top of the cover, thereby preventing it from entering the receptacle. It will be noted also that the upper end of the boss $d^3$ is made slightly conical, and that the lower end of the shaft M is made of the reverse form. This is for the purpose of deflecting any dirt or oil or other foreign matter which may get into the bearings of shaft M and directing it outward between the boss $d^3$ and the hub $m$ onto this deflecting flange $d^4$. It will also be noted that a cap O is secured to the under side of the arm H, thereby forming the bottom of the gear casing $h$. This cap is centrally perforated for the passage of the hub $m$ and the edges of the hole are curved up under the gear $k$, thereby forming a cup to catch any foreign material such as oil or dirt which may get into gears J and J' or their bearings.

The bar H may be removable from the top of the standard C. One standard may have a loop $c'$ into which a tongue $h^2$ on one end of said bar engages, and the other end of said bar may have any sort of a contrivance for connecting it with the top of the other standard. In the construction shown the standard has a pin $c^3$ which passes up through a hole in the bar, said pin having a groove in one side, to receive the edge of a button R pivoted on the top of the bar. This button has a notch $r$, and the button may be turned so that the notch comes adjacent to the pin, and thus permits the bar to be removed. The loop $c'$ is required to be of suitable size relatively to the tongue $h^2$ and to be placed with more or less accuracy, to enable it to perform its functions. In the construction shown it is formed upon the upper end of a plate $c^2$ which is adjustable vertically upon standard C to which it may be secured by a screw.

The described mechanism is adapted for use in small and large machines as well for family and for hotel purposes. In a family machine the platform B might be immovable and the bar H be removable; and in that construction the shaft J' and its gear $j'$ might be omitted. In that event the removal of the bar H and its parts would permit the removal of the receptacle A, so that it and its contained parts might be separated and cleaned. The invention might also be embodied in a large machine adapted to be driven by power. In that event it would doubtless be preferable to have the platform B vertically movable, and it is so shown in the drawing. It has downwardly projecting end pieces movable in suitable grooves carried by the supporting table S. A shaft is mounted in this table and is provided with cam $t$ engaging with the plate B, whereby it may be raised or permitted to drop. When the platform is lowered the lugs $a$ on the receptacle will be below the lower ends of the sides of the ribs $c$, wherefore the receptacle may be slipped forward from the platform.

For a power machine it is desirable to have both shafts J and J',—the shaft J being provided with a handle by which it may be turned, and the shaft J' provided with certain mechanism by which it may be driven by power in either direction. In the construction shown a pinion $j^2$ is attached to the outer end of the shaft J'. A bracket T is secured to the adjacent standard C, and in it is mounted a shaft V carrying a driving wheel $v$ and a small pinion $v'$. An arm W may be mounted upon this shaft V and may carry two shafts U, U', to which are respectively secured the gears $u$ and $u'$ which mesh with each other, while gear $u$ is in mesh with gear $v'$. The arm W may occupy three positions, and be held in either by means of a pin $w$ engaging in certain holes $c^5$ in the standard. In one of these positions the gear $u'$ will engage with the gear $j^2$. In the other extreme position the gear $u$ will engage directly with the gear $j^2$. In the intermediate position neither of the gears $u$, $u'$ mesh with gear $j^2$. In the first position a rotation of shaft V in one direction causes the shaft J' to rotate in the same direction. In the second position a rotation of shaft V causes shaft J' to rotate in the contrary direction. In the intermediate position the rotation of shaft V causes no rotation whatever of the shaft J'. In this latter case the mechanism may be operated by the crank $j^3$.

It is desirable that the platform B be elevated so as to permit a vessel to be placed beneath the valved opening through which the material is discharged from the receptacle. A hopper Z may be provided through which material to be treated may be introduced into the receptacle. This may be of any suitable construction and may be supported in any suitable way. As shown, it is secured to one of the cover sections around a hole therein.

Although the drawings show, and the foregoing description describes in detail, the best embodiment of the invention for the described use, it is to be understood that changes in the form, proportion, size and minor details of the mechanism may be made within the scope of the claims and without departing from the spirit of the invention.

Having described my invention, I claim:

1. In a machine of the character specified, the combination of a cylindrical receptacle, a beater frame centrally mounted therein upon a vertical axis and comprising top and bottom members and vertical members which lie close to the vertical wall of said receptacle, three vertical beater shafts rotatably mounted in said frame, the axis of one of said beater shafts being coincident with the axis of the beater frame, horizontal beater arms secured to said three shafts, and mechanism for simultaneously rotating the central beater shaft in one direction and the beater frame and the two outer beater shafts in the opposite direction but at different speeds.

2. In a machine of the character specified, the combination of a receptacle having a bearing secured centrally in its bottom, a beater frame rotatably mounted upon said bearing, a vertical shaft mounted in said frame on an axis coincident with the axis of the frame and projecting above said frame, two other vertical shafts mounted in said frame on opposite sides of its axis of rotation, each of said shafts being provided with a plurality of horizontal beater arms having inclined top and bottom faces, pinions fixed to the upper ends of said outer beater shafts, a gear meshing with said pinions and fixed to the upper end of the central shaft,—said gear and pinions being a substantial distance below the top member of said frame, and said shafts being capable of being moved endwise in their bearings, said two outer shafts having stepped bearings in the lower member of the beater frame, and mechanism engaging with the upper end of the central shaft for rotating it, and mechanism engaging said beater frame for rotating it in the opposite direction.

3. In a machine of the character specified, the combination of a cylindrical receptacle, a beater frame rotatable therein and having vertical members which lie close to the vertical side of said receptacle and have their inner faces beveled away from the said side, a vertical shaft rotatably mounted in said frame on an axis coincident with the axis of the frame, two other vertical shafts rotatably mounted in said frame on opposite sides of its axis, each of said three shafts being provided with a plurality of beater arms, a gear secured to the central beater shaft, relatively small pinions secured to the other beater shafts in mesh with said gear, and mechanism for independently rotating the beater frame and said central shaft.

4. In a machine of the character specified, the combination of a cylindrical receptacle having a discharge opening near its bottom, and a cap for closing said opening, a beater frame rotatable in said receptacle and having vertical members which lie close to the vertical side of said receptacle and whose outer faces are beveled away from said side, and having a bottom member which lies close to the bottom of said receptacle and has its lower face beveled away from said bottom but in different directions on opposite sides of the axis of the frame, a vertical shaft rotatably mounted in said frame on an axis coincident with the axis of the frame, two other vertical shafts rotatably mounted in said frame on opposite sides of its axis,—each of said three shafts being provided with a plurality of beater arms,—a gear secured to the central beater shaft, and relatively small pinions secured to the other beater shafts and meshing with said gear, a mechanism by which the beater frame may be rotated in either direction, and the central shaft in the opposite direction.

5. The combination of a vertically movable platform, fixed vertical standards on opposite sides thereof and provided each with a vertical groove, a receptacle resting upon said platform and having laterally extended lugs engaging said groove, a rotatable beater frame within said receptacle and having a boss on its upper member, a shaft mounted in said frame on an axis coincident with the axis of the frame and projecting through said boss, two other vertical shafts mounted in said frame, a plurality of horizontal beater arms secured to each of said shafts, intermeshing gears and pinions secured to said three shafts, mechanism for rotating the central shaft, mechanism for rotating said frame, and mechanism for raising and lowering said platform to cause the engagement and disengagement of said shaft and frame respectively with the two rotating devices by which they are turned.

6. In a machine of the character specified, the combination of a platform, standards at the side of said platform, a bar secured to the top of said standards and having a centrally placed casing and a vertical bearing within said casing, a gear mounted in said bearing and having a tubular hub with an angular socket in its lower end, a vertical shaft rotatably mounted within said hub and having a socket in its lower end, said hub and shaft having engaging shoulders, a beveled gear secured to the upper end of said shaft, a horizontal shaft mounted upon said bar projecting into said casing and provided therein with a beveled gear which meshes with both of the beveled gears mentioned, a cup plate secured to the under side of said bar below said casing and being centrally perforated and being turned upward around said perforations, a receptacle resting upon said platform, a beater frame rotatably mounted therein comprising a bottom member, two side members bers and a top member which is provided with an upwardly extended boss on which is an annular inclined flange, a beater shaft mounted in said frame on an axis coincident with the axis of the frame and being extended loosely through said boss,—said shaft and boss being of external angular formation at their upper ends and adapted to engage in the sockets in the lower end of the before mentioned hub and shaft,—two beater shafts mounted in said frame on opposite sides of the central shaft, intermeshing gears secured to said shafts, and horizontal beater arms also secured to said shafts, and two semicircular cover plates engaging with the top of said receptacle and loosely embracing said boss below the flange thereof.

7. In a machine of the character specified, the combination of a cylindrical receptacle, a beater frame centrally mounted therein upon a vertical axis and comprising top and bottom members and vertical members which lie close to the side of said receptacle, horizontal beater arms secured to said vertical members, three vertical beater shafts rotatably mounted in said frame, the axis of one of said beater shafts being coincident with the axis of the beater frame, and the axes of the other beater shafts being on opposite sides of said axis, horizontal beater arms secured to said three shafts, and mechanism for simultaneously rotating the beater frame and the two beater shafts in one direction and the middle beater shaft in the opposite direction.

8. In a machine of the character specified, the combination of a cylindrical receptacle, a beater frame rotatably mounted therein upon a vertical axis and comprising horizontal top and bottom members and vertical side members, a beater shaft loosely mounted in said frame on an axis coincident with the axis of the frame, two other vertical beater shafts loosely mounted in the top and bottom members of said frame on opposite sides of the axis thereof and having stepped bearings in the lower frame member, pinions secured to said two beater shafts, a gear secured to the middle beater shaft in mesh with said two pinions and provided with an annular flange which overhangs said pinions,—said shafts being movable endwise in their bearings, and said gear and pinions being secured to said shafts far enough below the upper frame member to permit said shafts to be moved up in said frame to free their lower ends from the lower frame member.

In testimony whereof, I hereunto affix my signature in the presence of two witnesses.

ALVIN C. PANCOAST.

Witnesses:
E. B. GILCHRIST,
H. R. SULLIVAN.